2,829,055
Patented Apr. 1, 1958

2,829,055

METHOD OF TREATING RICE

Ataullah K. Ozai-Durrani, Stuttgart, Ark.

No Drawing. Application July 13, 1954
Serial No. 443,149

9 Claims. (Cl. 99—80)

The present application is a continuation-in-part of my co-pending application, Serial No. 136,169, filed December 30, 1949, and now abandoned.

This invention relates to a method of treating rice and has for one of its objects the provision of a method of treating rice paddy or hulled rice grains to remove from a small amount, up to substantially all, of the rice oils and fats from the bran and polish coatings of the rice, thereby producing novel and superior rice products and conditioning the rice for storage or for processing to remove the hulls and bran and polish coatings from the grain surface, as may be desired.

Another object of the invention is to provide novel defatted rice products which have superior physical and chemical properties and also superior taste and appearance over rice which has not been treated in accordance with the process of the invention.

An additional object of the present invention is to provide an improved process for treating rice grains, including rice paddy, brown rice and white rice.

A further object of the invention is to provide a process for extracting the oil from the bran coating on brown rice grains.

Other objects of the invention will be apparent to those skilled in the art from reading the specification which follows.

In order that rice may be acceptable to the consumer, the product should be free from foreign matter, uniform in grain size and color, and contain a minimum amount of broken grains. The rice should have the natural flavor and aroma characteristic of rice, both before and after cooking. Brown rice, or hulled rice, should be free from the usual shagginess and non-uniform color which normally results upon storage of the brown rice of the prior art. White rice should be completely white and have the desired translucency which is sought by the consumer. Rice paddy, brown and white rice should be resistant to deterioration or becoming rancid and it is the ability to obtain rice products having these qualities, as well as other beneficial properties, which is one of the most important features of the present invention.

Rice has a distinctive flavor and aroma of its own. The present invention takes this fact into account and provides means which will not only preserve this flavor and aroma, but retain the nutritive components in the grains and preserve and enhance the physical appearance of the whole rice grains. Thus the present invention provides rice products which have their nutritive qualities substantially intact and which have greater appeal to the consuming public.

One of the most serious problems facing the rice producer is the propensity of rice, particularly rice paddy (known also as unhulled or rough rice), brown rice and white rice, to become rancid and deteriorate during normal storage. This rancidity and deterioration manifest themselves by the presence of an undesirable and somewhat bitter taste which is organoleptically detectable. Other concomitant disadvantages are also attributable to this rancidity. In the case of brown rice, there occurs an irregular recession of the initially smooth surface of the grain causing the surface to become shaggy and have a spotted and non-uniform coloring. This causes the product to have diminished sales appeal. As a consequence of becoming rancid the rice often becomes unmarketable and uses other than human consumption must be found, or the rice destroyed. Thus the producer finds that he is faced with substantial financial losses unless the problem can be overcome. The present invention accomplishes this purpose and prevents such losses as well as providing other significant advantages.

I have found that by removing the fats and oils from the rice paddy, brown rice or white rice, rancidity can be prevented. It is my belief that the rancidification of the rice is caused by oxidation of the fats; the oxidation mechanism probably consisting of an initial hydrolysis of of the fats or oils followed by oxidation of the fatty acids released during hydrolysis. This oxidation of the fats also causes a deterioration of the nutritive values of the rice. Enzyme action also causes fats to become rancid. The prior art investigators have attempted to overcome the tendency of the rice to become rancid by various methods, including the coating of white rice with glucose and talcum to preserve the rice. The disadvantages of such measures are apparent. These foreign substances add to the cost of the final product and impart unnatural taste and aroma to the rice. Rice treated with talcum and glucose must be labeled as "coated rice" in accordance with usage in the industry or Pure Food and Drug Laws. This rice must be washed very carefully before cooking. The rice of the present invention has no foreign substances present after the treatment has been completed.

Defatting of the rice grains in accordance with the present invention imparts other unexpected and desirable advantages to the rice product. The defatted rice grains are not as subject to deterioration by changes in climatic conditions, such as changes in humidity and temperature. Removal of the fats greatly reduces the vulnerability of the rice to bacterial, fungi, insect and pest infestation. The defatted rice byproducts, such as the hulls, polish, bran and germs also possess the same resistance to oxidation as the defatted rice grains. Additionally, other advantages in the physical characteristics, particularly those of defatted white rice and brown rice, result.

One of the advantages of the present invention is found in the ease with which the hulls of rice paddy treated in accordance with the present invention may be removed. Due to the ease of dehulling such paddy, the kernels of rice are substantially unbroken. The breaking of a substantial number of the kernels greatly reduces the value of the rice product. In accordance with one embodiment of my invention, the removal of the hulls from the rice paddy may be accomplished as a sequence of the defatting treatment and no separate dehulling treatment employing the conventional stones or shellers which causes substantial grain breakage, is required. In accordance with this embodiment of my invention rice paddy is extracted with one of the organic solvents to be disclosed. After removal of most of, but not all of, the fat-containing solvent, the solvent-containing paddy is shocked by suddenly increasing the temperature by between about 10° and 50° C. to substantially the flashpoint of the solvent employed and the solvent ignited with a flame or spark. As a consequence of this burning treatment, the hulls are burned and reduced to ashes and consequently fall from the kernel, leaving the kernel intact and unbroken. Thus this modification of the defatting treatment may serve a two-fold purpose; both defatting and dehulling. The quantity of solvent which remains on the hulls prior to ignition may be regulated so that no more solvent remains than will burn the hulls of the rice paddy without burning the bran and kernel. Also, I have found that it is not necessary to completely burn the hulls and the amount of solvent permitted to remain on the hulls may be so regulated that no more burning of the hulls takes place than is required to condition the hulls so that they fall away from the kernels.

Defatting of rice paddy or brown rice in accordance with this invention produces unexpected advantages in the removal of the bran coatings of brown rice. The bran is removed by "milling" wherein the rice grains, after dehulling, are fed through iron rolls to crack and remove the major portion of the bran coating thereon and then through polishing brushes to remove the remaining bran coating on the grains to produce what is known as polished rice grains. When milling ordinary brown rice it is often necessary to mix the brown rice with powdered limestone to impart additional scouring, abrasive action in removing the bran coating. Due to the heavy, scouring, frictional type of action required for ordinary brown rice, there is a loss of about 20%–25% in broken rice grains encountered in passing through the iron rolls. The employment of the powdered limestone produces additional breakage of the grains. In addition the rolls and brushes must be frequently cleaned to remove therefrom the bran and rice oil adhering thereto. The elimination of the losses in broken rice grains and the added costs of cleaning rolls and brushes is one of the major objects of the present invention.

The presence of the naturally occurring fats in the rice bran makes the brown rice more difficult to mill because it frequently causes clogging of the milling equipment. When a substantial proportion of the fats has been extracted, the bran coating may be much more easily removed, thereby reducing the breakage of the grains and eliminating the need of employing powdered limestone to efficiently remove the bran coating. My invention permits the removal of the bran coating by employing only light lateral compression on the grains to place the bran coating in condition for the polishing brushes, thereby reducing drastically the number of broken rice grains. In some cases action of the polishing brushes is all that is required. The bran product thereby obtained, where the rice oil has been substantially completely removed from the bran coating, may be stored indefinitely without deterioration.

If desired, brown rice defatted in accordance with my invention will permit partial or graduated removal of the bran coating. By regulating the conditions of milling the defatted brown rice, one may control the degree of removal of bran should it be desirable to retain some of the vitamin and other nutritional components normally contained in the bran.

It is particularly desirable to remove the fat in accordance with the process of this invention from parboiled rice paddy. Parboiled rice, prepared by saturating rice paddy with water at a temperature below its gelatinization temperature (about 60° C.) and subsequently heating the water-saturated paddy to gelatinize it, then drying it to reduce its moisture content to about 13%, followed by dehulling, is very difficult to mill. The bran coatings are quite sticky and consequently clog the milling equipment. The defatting of such rice is the only means I have found by which such rice can be placed in condition to be milled satisfactorily and economically.

The defatting treatment of the present invention produces desirable improvement in the physical characteristics and appearance of rice. This is an important advantage of the invention, as the appeal of the product to the consumer will be governed to a great extent by the attractiveness of its appearance. Brown rice which hase been defatted or produced from defatted rice paddy has a very attractive uniform light-cream or almost white color as compared to the somewhat disagreeable dark brown color of the normal product containing the components. The surface of the grain is quite smooth and remains so even after being stored for considerable periods of time. Milled rice prepared from defatted brown rice or which has been defatted in accordance with the process of the present invention after being milled has a very distinctive white identification mark or spot at the end of the grain where the germ was attached to the endosperm. This identification mark is characteristic of rice grains produced by the process of the invention.

When the rice is only partially defatted, and not all of the oils and fats removed, the rice grain may have a slightly streaky surface. This is easily remedied by placing the rice in a conventional rice mill coating tumbler. Instead of coating with talcum and glucose, as is the practice of the prior art, a very light spray of water (cold or warm water or even steam will do) is introduced in a quantity just sufficient to increase the moisture content of the rice by about 0.25% to 1.0%. This will eliminate any streakiness and the surface of the grain will become smooth and uniform. If desired, the quantity of spray water introduced in to the tumbled rice may be sufficient to saturate the rice with water at a temperaure below its gelatinization temperature, which is 60° C. The moisture content of the rice when saturated below this temperature may contain up to about 29% or 30% moisture. While the streaky appearance of the rice will disappear after this saturation treatment, the rice should be dried to a stable moisture content of about 13% so that it may be stored without spoiling. The volume of rice so treated will be slightly greater than for the rice which is unsaturated with water. When about 0.25% to 1% water is employed, no drying treatment is necessary as this moisture will be lost to the surrounding atmosphere.

In accordance with my invention I have discovered that rice oil is highly soluble in low specific gravity petroleum fractions, such as hexane and pentane, and that by immersing rice paddy, brown or white rice in such petroleum fractions for a determined length of time and at a determined temperature below the boiling point of the solvent, I can extract from small amounts up to substantially all of the rice oil and fat content of the bran coating of the rice grain thereby providing a rice product that may be stored indefinitely without deterioration or that may be easily processed for the removal of the hulls and bran and polish coatings therefrom with formation of a polished rice product. The rice oil dissolved in the said solvent may be recovered therefrom by fractional distillation as a rice oil and fat product that is stable and highly edible.

My defatting process may be conducted according to several preferred embodiments. When defatting ordinary rice paddy, I prefer first to reduce the moisture content of the paddy to about 13% if it is not already reduced to this concentration. As a result of drying, the kernel shrinks in dimensions within the hull, without any appreciable shrinkage on the part of the hull. This shrinkage of the kernel within the hull produces an air space between the hull and the kernel. Air is much more sensitive to volume variation with changes in temperature, than are the hulls and kernels. The latter change very little in volume when subjected to sudden temperature changes. When the rice paddy is shocked by a sudden increase in temperature, the air between the kernel and the hull expands rapidly and creates a positive pressure which forces some of the air out through the pores of the hulls. The temperature of the hulls and the kernels (and primarily that of the hulls) rises above the initial temperature by perhaps 2° to 10° C., depending upon the temperature increase to which the paddy is subjected, without any substantial increase in hull or kernel volumes. The rice paddy is then promptly surrounded with or immersed in a suitable low specific gravity petroleum fraction of lower temperature than the paddy, which causes the rice paddy to cool. That air remaining between the kernels and the hulls shrinks, creating a partial vacuum. The surrounding solvent is thus forced into the hulls until the pressures inside and outside of the hulls have been equalized. The solvent penetrates the softer textured oil-bearing bran layers of the kernels. The solvent which is desirably employed in an amount constituting about 10% by weight of the rice, solubilizes some of the fat. The rice paddy is then subjected to an increase in temperature, preferably in excess of the boiling point of the solvent. The solvent-containing extracted fat expands, forcing the fat-containing solvent out of the hulls. This solvent treatment may be repeated until the desired amount of fat is removed.

Rice paddy which has been parboiled is particularly suitable for the defatting treatment. During parboiling the kernels expand splitting the hulls at either one or both ends. When the parboiled paddy is dried to a stable moisture content of about 13%, the kernels shrink to a smaller size but the hulls retain an unshrunken condition with the hulls open at seams along the length of the hulls where the splitting has occurred. This parboiled paddy may be suitably extracted with solvent without resorting to the evacuation treatment referred to hereinabove, because the solvent will readily enter through the open end or ends by capillary action, permeation or osmosis and readily escape. The fats of the rice, which are primarily in the bran are extracted by the solvent and the solvent drained from the paddy.

Brown rice may be defatted by immersing or contacting the dehulled rice grains with a solvent, such as one of the preferred low specific gravity petroleum fractions of the invention, including hexane or pentane, desirably at a temperature and for a time interval required to dissolve substantially all of the rice oil content of the bran coating. The liquid solvent is then drained from the rice grains and the residual solvent is removed from the rice grains either by vacuum distillation or by heating the grains to a temperature above the boiling point of the solvent, or by exposing the grains to a current or blast of air. If desired, the solvent is removed from the rice grains by heating and a temperature of heating may be employed that is effective to destroy the enzyme and bacteria, such as a temperature within the range of about 95° to 105° C., although lower temperatures slightly above the boiling point of the solvent may be employed. The rice grains thereafter may be passed through the rollers and polishing brushes for the removal of the oil-free bran surface coating thereon to produce the desired polished rice product. The rice oil content of the solvent is recovered by fractional distillation and the solvent is recovered and returned for reuse in the treatment of other dehulled rice grains.

During the entire defatting treatment I prefer to maintain the temperature of the rice grains low enough so that there is little or no moisture elimination. If moisture from the rice grains is volatilized and condenses on the neighboring grains, the neighboring grains are weakened and break readily during milling. It is important that the grains remain unbroken after milling and this precaution will prevent breakage.

White rice may also be defatted in accordance with the process of the invention in substantially the same manner as for brown rice. The defatted white rice produced possessses all of the desirable storage stability, taste, appearance and physical and chemical properties of defatted rice products.

When defatting rice kernels having bran layers, it is desirable to avoid solvent penetration below these layers. This is accomplished by careful adjustment of the duration of contact of the solvent with the rice, consistent with the temperature of the solvent and of the rice. I have found that with brown rice, I may extract substantially all, or in excess of 90% of the fat and oil by contacting the brown rice with warm hexane for almost 30 seconds. In general, at normal room temperatures hexane will remove substantially all of the fat and oil from the bran coating within an immersion period of 5 minutes at the most, but by warming the hexane to a temperature somewhat below its boiling point (69° C.), namely, about 40° to 50° C., the time required may be reduced to between about 15 seconds and 3 minutes.

One preferred method which permits continuous operations for extracting the fat and oil from the rice is to pass precalculated amounts of continuously moving rice on a conveyor under a continuous spray of freshly condensing solvent. The duration of the time of contact of the rice with the solvent may be decreased if the rice is stirred or agitated during the spray treatment with the solvent. I have found that the employment of freshly condensing solvent produces more effective extraction of the fat and oil since freshly condensing or "nascent" solvent very quickly penetrates the bran coating covering the rice kernel. The freshly condensing solvent may suitably be produced by distilling the solvent and condensing it just about the time the solvent vapors reach the rice to be extracted. In this way a semi-liquid and semi-gaseous solvent is brought into contact with the rice. If desired, the distillation and condensation may be conducted under vacuum which will lower the temperature of the condensing solvent. If a higher temperature of the condensing solvent is desired, the distillation and condensation of the solvent may be conducted under super-atmospheric pressure. This embodiment of my extraction process is quite flexible and adjustments may be made where necessary to proceed in the most efficient and economical manner. Where the solvent employed has a boiling point below the temperature of the rice being defatted, contact with the rice will cause the solvent vapors to expand, thus cooling the rice. The cooled rice serves to condense the solvent which extracts the fats from the rice. As the fat-containing solvent and extracted rice separate, a slight increase in temperature aids in expelling the residual solvent from the rice. The employment of low temperature extraction provides defatted rice with excellent milling properties, even though it may not extract fats as efficiently as will the warmer solvents.

According to another embodiment of my invention, I have found that petroleum fractions which boil at about 1° C. or above and which are normally gases at ordinary room temperature and atmospheric pressures may be conveniently employed to defat rice. I accomplish extraction with these solvent fractions, and preferably butane, by passing the rice to be extracted downward through a column and permitting the butane gas to rise and pass over the descending body of rice. The gas should desirably be at a temperature near its boiling point and as it passes over the rice, the rice will become cold from the expanding, cold butane gas. The cold rice will in turn liquify some of the rising butane gas and the liquid and gaseous solvent mixture will extract the fat from the rice. Such solvents offer definite advantages. No external heat is required to volatilize the solvent and the solvent is easily removed from the rice grains without leaving an odor. Since the rice is not heated, no water is removed from the grains to condense on neighboring grains and cause grain breakage during milling.

In general, I have found that removal of all of the fat and oil fractions from the rice is not always necessary. Brown rice contains about 2% fat and oil, while white rice or polished rice contains about 0.3% fat and oil. Fats of higher molecular weight, which have higher melting and boiling points, constitute approximately 30% of the fat content of the rice. These fats are normally solid at ordinary room temperature. They are more stable than are the lower melting fats or oils under normal atmospheric conditions and they do not as a rule affect the rice detrimentally. The liquid fats or oils which form almost 70% of the fatty content of the rice are highly subject to rancidification, particularly those having lower molecular weights and lower melting and boiling points. Thus, oils which volatilize at atmospheric temperatures are especially prone to become rancid.

While I have found that the removal of as little as 10% of the rice fat and oil content of the bran coating may sufficiently loosen the bran from the grain surface so that subsequent removal of the bran coating from the rice kernel by the polishing brushes may be facilitated somewhat, I prefer to remove at least 70% of the total fat or oil content of the rice, and particularly those fatty fractions which are normally liquid at room temperature and which constitute about 70% of the total fat or oil content of the rice. In other cases the removal of about 30% of the total fat content may serve the purposes of the present invention to a practical degree. However, as the rice oil is a valuable by-product and is not necessarily a desired constituent of the rice bran product, I prefer to remove substantially all of the oil from the bran coating by the practice of the present invention. Where the rice oil is substantially completely removed from the bran coating, the coating is very easily removed from the grain by the polishing brushes.

I have discovered that the low specific gravity petroleum fractions having a boiling point at atmospheric pressure of between about 1° C. and 72° C., and preferably 40° C. to 72° C., such as hexane and pentane, are the most suitable solvents for employment in practicing the present invention. While other organic solvents and other petroleum fractions may produce a satisfactory degree of fat and oil extraction from the rice, they suffer from serious disadvantages which make their use undesirable. For example, the higher boiling petroleum fractions are extremely difficult to remove from the extracted rice. Even after days of aeration and heating, they remain present in the rice and leave a persistant odor and taste in the grain. Even when rice extracted with such a solvent is cooked in boiling water this foreign taste and odor persists in the cooked rice.

The halogenated, or chlorinated, hydrocarbon solvents, such as dichloroethylene, trichloroethylene and carbon tetrachloride, are satisfactory from the standpoint of oil extraction qualities, but they too boil at a high temperature and just as in the case of the higher boiling petroleum fractions, it is almost impossible to separate all of the solvent from the extracted rice. Since these solvents contain chlorine there is always a tendency for the chlorine to dissociate from the solvent during extraction which may cause an undesirable discoloration of the rice. These halogenated solvents are costly and impractical for use as solvents in extracting rice for the reasons enumerated.

Those solvents which volatilize at lower temperatures than contemplated by the present invention are also objectionable. These solvents, when expelled from the rice by evaporation, are likely to cool the moisture in the rice kernel to below the freezing point and produce hard crystals of ice. These ice crystals produce a weakening of the structure of the rice kernel and when rice extracted with these solvents is milled it is likely to break into fragments greatly reducing the value of the rice.

Ethyl ether, acetone and other such solvents also have a distinct odor and are generally not suitable for defatting rice. They impart a very disagreeable odor and taste which cannot be effectively removed from the grain. These solvents also extract some of the vitamins and nutritive components of the rice thus reducing the food value of the extracted rice. They also possess explosive and toxicity hazards for manufacturing personnel who are exposed to the solvents.

Summarizing the pre-requisites of a satisfactory solvent, for the invention, it should be noted that the solvent will desirably have a uniform boiling temperature range, be substantially free from water, have a boiling point of between about 1° and 72° C., and preferably between 40° and 72° C. The solvent should desirably permit efficient extraction of the fat from the rice within an exposure period of 15 seconds and 5 minutes. The solvent should be easily removable from the rice after extraction and produce a minimum increase in the temperature of the rice when the solvent is brought into contact with it (within 2° C. and 55° C.). The solvent should also not remove more than a minimum of the moisture content of the grain, nor should it deposit water in the grain during the extraction. The solvent should be selective in extracting the fats and oils without extracting substantially large quantities of the vitamins and other desirable nutritive components. I have found that the low specific gravity petroleum fractions, which are hydrocarbon compounds, and particularly pentane and hexane, are ideally suited for use in this invention. Of course, mixtures of solvents having the desired properties may be employed.

In general, I have found that varying quantities of solvent may be employed in effecting the defatting operation, quantities of between 5% and 25% based on the weight of the rice produces most satisfactory results. When the rice is conveyed through a spray of condensing solvent or immersed in the solvent, the coefficient of absorption of the solvent varies between 1% and 5% by weight of the rice depending upon the moisture content of the rice, the concentration of fat and oil in the grain, the concentration of the bran layers on the grain and the looseness and denseness of these bran layers. In most cases, I find that after the excess solvent has been drained from the rice, the extracted rice will retain between about 1% to 5% solvent based on the weight of the rice. The removal of this retained solvent may be effected by exposure of the rice to a hot or cold air blast, by exposure of the rice to a short steam blast or by passing the extracted rice over warm surfaces with or without the application of vacuum.

In order more clearly to disclose the nature of the present invention, specific examples illustrating the present invention will be hereinafter described. It should be understood, however, that this is done solely by way of example and is intended neither to delineate the scope of the invention nor limit the ambit of the appended claims.

*Example 1*

Dehulled rice grains, pre-heated to about 50° C. were immersed in hexane, also pre-heated to about the same temperature, for from about 1 to 2 minutes. The grains were separated from the solvent as by draining, and heated to 95°–105° C. to drive off the residual solvent present therein, and then the grains were cooled at atmospheric temperatures. When cold, the grains were passed through the rollers and polishing brushes, commonly employed in the art, to remove the bran coating from the surface of the grains and to form the polished rice product. In this specific embodiment, the temperature of heating (95° to 105° C.) for the removal of the residual solvent from the rice grains was chosen for the purpose of killing bacteria and breaking down enzymes to improve the storage quality of the bran and polished rice products. Alternatively, the rice grains at 20° C. may be immersed for 3 to 5 minutes in the hexane at 20° C., drained and heated to 95°–105° C. and passed through the rollers and polishing brushes, to obtain substantially the same result.

*Example 2*

At 100 kilograms of rice paddy at a temperature of 30° C. were momentarily passed through a blast of hot air at 110° C. The paddy was then submerged in a container filled with hexane at a temperature of 30° C. The excess solvent was removed from the paddy. The paddy weighed 117 kilograms, indicating that it had retained 17 kilograms of the solvent. The paddy was surface dried and weighed again. It was found to weigh 13 kilograms in excess of its original weight of 100 kilograms. The steam and the expelled mixture of fat and hexane were collected by condensation. About 20% of the oil and fat originally in the rice was found to have been contained in the extract. The procedure was repeated until almost all the oils and fats from the surface of the rice were removed.

*Example 3*

About 100 kilograms of rice paddy at a temperature of 30° C. were placed in a cylindrical container filled with an outlet and inlet for steam. Steam at 100 pounds pressure was introduced momentarily, escaping freely from the outlet. The steam was turned off. From another inlet, hexane under high pressure was introduced and filled the container. The hexane was then withdrawn. It was found that the rice retained 10% of the hexane on the hulls and the kernels. The rice was then again heated and most of the mixture of extracted fat and hexane was forced out, containing about 20% of the oil originally present in the rice.

*Example 4*

About 100 kilograms of rice paddy at a temperature of 30° C. were placed in a cylindrical container fitted with an outlet and inlet for sand. Sand at a temperature of 200° C. was introduced and was allowed to mix with rice freely. The sand was shaken out and separated from the rice. From another inlet, hexane under high pressure was introduced and filled the container. Excess hexane was removed and some of the hexane retained by the hulls and the kernels. The rice was then again heated to about 100° C. and most of the hexane was expelled within, containing about 20% of the oil originally present in the rice kernels. When desired, this procedure was repeated until substantially all of the fat and oil were removed.

*Example 5*

Brown rice at 22° C. was placed in a perforated bottomed container in a plant-size fractionating column. A sufficient amount of boiling commercial grade hexane having a temperature of about 60° C. was poured over the rice for about 30 seconds. The hexane, dissolving the fatty fractions from the rice, dropped down at the bottom of the fractionating column. The mixture of extracted fat and hexane was collected and heated to separate the fat from the hexane. By this method, the fat obtained from the brown rice was calculated. 70% of the rice fat was removed and collected. The initial temperature of rice of 22° C. rose to 35° C.

*Example 6*

Brown rice was defatted in accordance with Example 5 with the following modification: The hexane was distilled just prior to passing it over the brown rice grains placed in the fractioning column. The hexane was permitted to condense directly on the rice grains and extract the fat from the bran coating. The initial temperature of the rice grains of 22° C. increased to 40° C. during the treatment. About 90% of the total fat content of the grain was removed.

*Example 7*

Parboiled rice paddy, prepared by saturating rice paddy with water at a temperature below the gelatinization temperature of the rice (below about 60° C.), and then steaming the rice, after which the rice was dried to a stable moisture content of 13%, had the hulls split at the ends of the paddy. The parboiled paddy was immersed in hexane, the hexane withdrawn, and the hexane permitted to drain from the paddy. The residual hexane was removed from the paddy by subjecting the paddy to a warm air blast at about 50° C. About 60% of the rice fat was removed from the paddy.

*Example 8*

Rice paddy was immersed in hexane at 60° C. for about 1 minute. The hexane was withdrawn and the paddy drained of excess solvent. The paddy was warmed until only about 1% of hexane remained on the paddy. The paddy surface was then immediately and rapidly heated to a temperature of about 60° C. (well above the flash point of the hexane) and the hexane ignited by an open flame. This caused the hulls to burn and they were reduced to ashes without affecting the kernels.

One of the advantages of the present invention for the removal of the rice oil is that the oil is extracted from the dehulled rice grain before the oil has been in part deteriorated by oxidation or enzyme reaction into free fatty acids and the rice oil product after recovery from the solvent is substantially free of such free fatty acids and of such enzymes and may be stored for long periods of time without deterioration.

Another advantage of the present invention is that by removing the rice oil from the bran coating and the paddy hulls before removing the coating from the grain, and the hulls from the paddy, the losses heretofore experienced due to broken rice grains in passing the grains through the iron rollers to crack the bran coating are completely eliminated. The normal dehulling operation is also greatly simplified or made unnecessary.

A further advantage is that the time interval required for the removal of the bran coating from the rice grains by the rollers and polishing brushes is relatively short and the amount of the rice grain surface removed with the bran coating is materially reduced thereby providing an improved bran product.

As used in this application, the term "fat" is intended to encompass some glyceridic esters which are normally liquid at room temperature as well as those which are normally solid at room temperature. It is intended to use the terms "fat" and "oil" interchangeably.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. The process of removing the rice oil content of the bran coating on dehulled rice grains which comprises immersing the whole grains in a solvent consisting of a low specific gravity petroleum fraction for a time interval at a temperature less than the boiling point of the solvent adapted to obtain the extraction of the significant portion of the rice oil content of the bran coating.

2. The process of claim 1, wherein said solvent is hexane and the temperature approximates 50° C. and the time approximates one and one-half minutes.

3. The process of claim 1, wherein said solvent is hexane and the temperature approximates 60° C. and the time about one-half minute.

4. The process of treating dehulled rice grains to facilitate the removal of the bran coating thereon which comprises immersing the whole grains in a rice oil solvent consisting of a low specific gravity petroleum fraction for a time interval adapted to dissolve in excess of 10% of the rice oil content of the bran coating thereon.

5. The process of claim 4, wherein said rice oil solvent comprises hexane.

6. The process of treating rice grains which comprises de-hulling the grains, contacting the de-hulled grains in hexane for a time interval and at a temperature selected to obtain the removal of in excess of 10% of the rice oil content of the bran coating on the grain and then polishing the rice grain to remove the bran coating therefrom.

7. The process of claim 6, wherein the said rice grains are immersed in hexane which has been freshly distilled.

8. The process of claim 6, wherein the said rice grains are immersed in hexane at a temperature approximating 60° C. for about one-half minute.

9. The process of treating rice grains which comprises de-hulling the grains, immersing the de-hulled grains in a rice oil solvent consisting of a low specific gravity petroleum fraction for a time interval and at a temperature selected to obtain the removal of at least 70% of the rice oil content of the bran coating on the grains, and then removing the bran coating by polishing the grains.

References Cited in the file of this patent

UNITED STATES PATENTS

| | | |
|---|---|---|
| 2,314,282 | Levin | Mar. 16, 1943 |
| 2,498,573 | Ozai-Durrani | Feb. 21, 1950 |
| 2,530,272 | Thrasher | Nov. 14, 1950 |

OTHER REFERENCES

Brown: J. A. C. S. 25 (1903), pp. 948–945.

Texas Ag. Experiment Station, Bulletin 191, June 1916, page 36.